W. W. HANNAH.
Animal and Insect Traps.

No. 141,346.  Patented July 29, 1873.

Witnesses.

Inventor
W. W. Hannah.
by his Attys.

UNITED STATES PATENT OFFICE.

WILLIAM W. HANNAH, OF HUDSON, NEW YORK.

IMPROVEMENT IN ANIMAL AND INSECT TRAPS.

Specification forming part of Letters Patent No. 141,346, dated July 29, 1873; application filed May 20, 1873.

*To all whom it may concern:*

Be it known that I, WILLIAM W. HANNAH, of Hudson, in the county of Columbia and State of New York, have invented a new and Improved Animal and Insect Trap; and I do hereby declare the following to be a full and exact description of the same, reference being had to the accompanying drawings forming part of this specification, in which—

Figure 1:
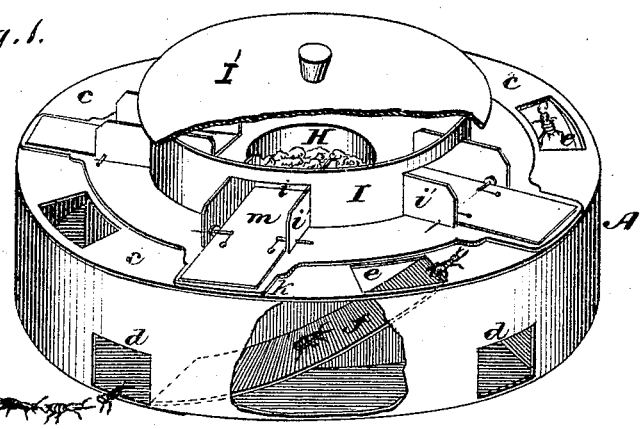
Figure 2:
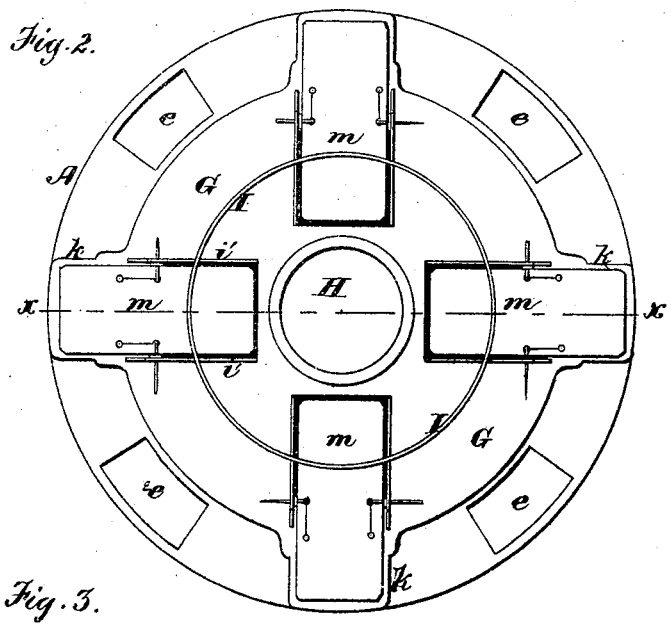
Figure 3:
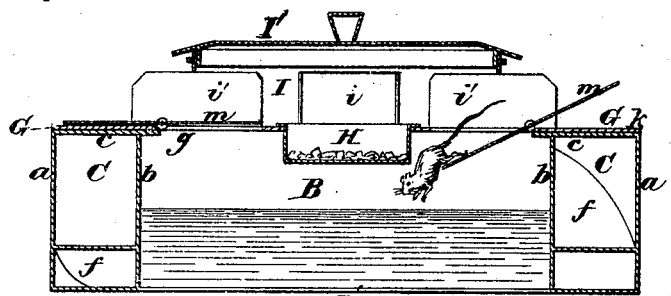

Figure 1 is a perspective view, a portion of the wall of the trap having been broken away to reveal the internal construction. Fig. 2 is a top plan with the central cover removed; and Fig. 3 is a vertical section in line $x\ x$ of Fig. 2, including the cover of Fig. 1.

Similar letters of reference in the accompanying drawings denote the same parts.

The object of my invention is three-fold—viz., to render the trap certain and effective in the capture and, if necessary, the destruction of insects and other small animals; to prevent the animal from escaping after it has once reached the vicinity of the bait; and to conveniently combine with a single receiving-chamber and a single bait-holder a series of trap-doors, in order to insure the capture of a larger number of insects, &c., and to facilitate their approach to the bait from any side of the trap. My object, also, in constructing and arranging the parts of the trap, as I shall presently describe, is to make it neat and handsome in appearance, portable, easily opened for cleansing, renewing the bait, &c., and with provision for the convenient removal of the captured animals.

To these ends the invention consists, first, in the use of mica trap-doors; secondly, in the method of pivoting said doors; thirdly, in the method of supporting and protecting said doors; fourthly, in the construction of the passages leading to the bait; fifthly, in the construction of the inclined passages leading from the floor, upon which the trap may set, up to the top of the trap; sixthly, in the arrangement of the several passages to the bait, around the bait-box, and over the receiving-chamber; seventhly, in constructing all said passages to the bait upon a single removable plate; and eightly, in the combination of the removable cover with the said passages and the trap-doors therein, all in the manner and for the purposes, substantially, as I will now describe.

In the drawings, A is the trap, having a central chamber, B, for the reception of the animals as they are precipitated through the several trap-doors, and having a chamber or space, C, around the chamber B for the inclined passages $f$, leading from lateral openings, $d$, at the lower edges of the side wall, up to horizontal openings $e\ e$ in the top plate of the trap. Into the top of the central chamber B fits an annular plate, G, held in place by a flange, $g$, on its under side, and provided with a flange, I, on its upper side, which incloses the bait box or hook H and the space immediately around it, said space being covered by a cover or lid, I, secured in place in any suitable manner, and having a small handle for convenience in lifting the trap. Through the wall I openings $i$ are provided to enable the animal to approach the bait, but before they can reach it they are precipitated into the chamber B by means of mica trap-doors $m$ arranged in the plane of the plate G under the openings $i$ in the wall I, as shown. Side flanges $i'\ i'$ prevent the animal from escaping laterally when the trap-door begins to fall, and the cover I cuts off his escape over the top of the wall. The rim of the cover also projects outside of the flange I, so that when the trap-door falls its rear end rises against said rim and closes the passage behind the animal. The plate G is extended inward to the pivot $n$ of the trap-door, so as to leave no escape behind said pivot when the door is down; and said plate is also provided with an outward extension, $k$, upon which the outer end of the mica trap-door rests, for the purpose of protecting the latter from accidental injury when the plate G is removed from the trap. The employment of mica for the counterbalanced trap-door enables me to adjust its balance with the greatest possible nicety, so that the smallest insects approaching the inner edge of the door will weigh it down and fall from it into the receptacle below, where they may be collected and secured for the purposes of observation or experiment, or where they may be drowned by partially filling the vessel with water. The trap-doors are supported upon fine steel needles, n, introduced, as shown in the drawings, through slits s cut in the mica and terminating in small round holes, o, to accommodate the needles and hold the trap-doors properly in position.

The details of construction may, it is obvious, be considerably varied without departing from the principles of my invention. For the larger animals the use of mica for the trap-doors may be abandoned, and tin or other sheet metal substituted. Any convenient or desirable number of passages, i i', may be employed; the form of the trap and all the concentric parts thereof may be polyhedral instead of cylindrical; the bait-holder may be a part of, or rigidly secured to, the plate G, and may extend above, instead of below, said plate; the bait may be covered with wire-gauze to protect it from the insects; and, finally, if preferred, the receiving-chamber may be provided with sliding boxes or drawers, capable of introduction and removal through the side of the trap, provision being made for that purpose, or the whole chamber may be constructed in the form of such box or drawer, and may be provided with a cover, which can be slid in upon the box before it is removed, so as to prevent the escape of the captives.

Having thus described my invention, what I claim as new is—

1. The trap-doors m, constructed of mica, for the purpose set forth.

2. The trap-doors m, pivoted upon needles extending through slits or holes in the mica, substantially as described, for the purposes specified.

3. The trap-doors m, combined with the plate G, having supporting and protecting flanges k under the doors, substantially as described, for the purposes set forth.

4. The passages leading toward the bait-holder, the pivoted doors m, the side flanges i i', the overarching flange I, and the projecting cover I', combined and arranged substantially as and for the purposes described.

5. The inclines f, arranged around the trap and combined with the openings d and e, substantially as described, for the purposes set forth.

6. The combination of a single central bait-holder, H, and a single receiving-chamber, B, with a series of passages arranged above the receiving-chamber and converging toward the bait-holder, substantially as and for the purposes specified.

7. The parts I I' H m i' k and plate G, which fits the top of the chamber B, when said parts and plate are constructed, combined, and relatively arranged in the manner described.

W. W. HANNAH.

Witnesses:
 MELVILLE CHURCH,
 L. HILL.